Figure 1:
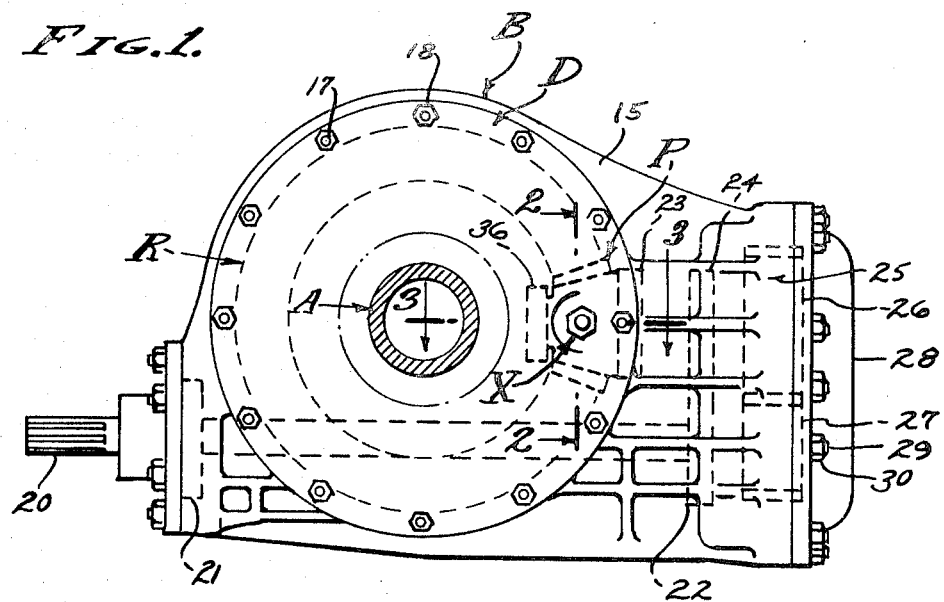

United States Patent [19]
Halibrand

[11] 3,745,848
[45] July 17, 1973

[54] SIDE THRUST LIMITER FOR RING AND PINION GEARING

[76] Inventor: Henry T. Halibrand, 1506 W. 228th St., Torrance, Calif. 90501

[22] Filed: Dec. 30, 1971
[21] Appl. No.: 214,234

[52] U.S. Cl. .................................. 74/410, 74/424
[51] Int. Cl. ....................... F16h 57/00, F16h 1/18
[58] Field of Search .................. 74/410, 409, 424

[56] References Cited
UNITED STATES PATENTS
| | | | |
|---|---|---|---|
| 1,847,611 | 3/1932 | Hodgkinson | 74/410 |
| 3,252,348 | 5/1966 | Folkerts | 74/409 |
| 3,434,374 | 3/1969 | Barwig et al. | 74/410 X |
| 3,557,634 | 1/1971 | Bixby | 74/694 UX |

Primary Examiner—Leonard H. Gerin
Attorney—William H. Maxwell

[57] ABSTRACT

A limiting means that prevents excessive lateral deflection of a ring gear in opposition to the side thrust imposed by applying torque through interengagement with a pinion gear, and in the form of a closely adjustable thrust bearing engageable with the side of the ring gear as and when it is laterally deflected so as to restrict said deflection and thereby prevent undue damaging stresses otherwise imposed upon the bearings and supporting structure such as the gear case.

21 Claims, 3 Drawing Figures

SIDE THRUST LIMITER FOR RING AND PINION GEARING

BACKGROUND

Ring and pinion gearing is the subject of this invention, and which takes a wide variety of forms and uses. A most widely known use of such gearing is in the differential drive of motor vehicles, and it is here that great stresses are involved. Not only is there the application of power at high torque rates, but there is the application of power surges and impact loads in addition thereto. Whatever the case may be, there is the application of strenuous forces which are applied without prediction and far in excess of the normal loads and pressures for which a gear case is expected to withstand. Consequently, it is not uncommon for the gear case housing a ring and pinion gear set to be broken apart, due to excessive side thrusts which causes and which is aggreviated by the separation of the intermeshing gear teeth, and all of which contributes to the augmenting of strains resulting in the ultimate failure of the structural support of the gear case housing. In the event of such a housing failure which invariably results in displacements of the ring and pinion axes, major repairs and/or complete replacement becomes necessary.

FIELD OF INVENTION

The operation of high performance vehicles, namely race cars, requires the use of highly engineered components among which are the drive axle and ring and pinion unit. These units are commonly referred to as "rear ends" in rear wheel drive cars and they vary widely depending upon the use to which they are to be put. That is, they are provided with and without differential gearing, in which case the axles are either split or straight through. Many championship race cars are provided with straight through tubular axles, and it is this type of competition ring and pinion unit which is shown herein, although it is to be understood that the thrust limiting idea of means herein disclosed is equally applicable to other ring and pinion gear units.

Ring and pinion gear cases of the type under consideration are often made of light weight metals stressed to safety factors compatible with normal expected use. Reference is made to race car transmission and axle housings which are put to strenuous use subject to unexpected loads in excess of those designed for, and particularly to side thrust loads on the ring gear which often result in damaging deflections. It is a general object of this invention to provide a side thrust limiter in gear cases of the type under consideration which prevents excessive deflections resulting from side thrusts imposed upon the ring gear case to withstand the otherwise damaging effects. With the side thrust limiter herein disclosed the interengagement of the ring and pinion gear teeth is not permitted to separate in a manner to augment the side thrust forces that are applied, and consequently there is a substantially lesser tendancy for the teeth to climb out of said interengagement; thereby limiting the damaging effect of the initial side thrust.

An object of this invention is to provide a side thrust limiter that is adapted to be incorporated in a gear case to engage a ring gear and thereby restrict its lateral deflection. With the present invention, the ring gear is normally free to revolve without frictionally engaging the side thrust limiter; however, side thrust applied to the ring gear when torque is applied at the pinion gear will cause deflection and consequent engagement of the ring gear with the side thrust limiter. It is the marginal side face of the ring gear which engages with the side thrust limiter when deflection occurs.

It is another object of this invention to provide a side thrust limiter of the character thus far referred to and which is adjustable relative to the ring gear location, axially independent of the pre-load and/or axial position of said ring gear.

SUMMARY OF INVENTION

The present invention is incorporated in a gear case B that houses a ring and pinion gear set, in order to protect the case when excessive torque is applied to the gear set, and which will enable the gear case to withstand greater side thrust loads by resisting lateral movement of the ring gear R relative to the pinion gear P. As will be observed, the positioning and the deflection of the pinion gear P is not as great a problem, since it is of relative small diameter and is located adjacent the support bearings. However, the lateral movement at the periphery of the ring gear R is a great problem inasmuch as torque applied through the pinion gear P results in side thrust and consequent lateral deflection at said periphery. Therefore, and in accordance with this invention, I have provided the side thrust limiter X which is engageable with the marginal portion of the ring gear R in opposition to the pinion gear P engageably therewith. In the preferred form, the side thrust limiter X is adjustable and in the form of a bearing 10 having a thrust face 11 that is selectively positioned as circumstances require to have interface engagement with the side face of the ring gear R as and when it is deflected laterally thereagainst. Accordingly, the ring gear R is rotatably journaled in the case B upon an axle A supported in carrier bearings 12 which operate in the usual manner to take the normal axial and radial thrust loads imposed upon said ring gear R.

DRAWINGS

The various objects and features of this invention will be fully understood from the following detailed description of the typical preferred form and application thereof, throughout which description references is made to the accompanying drawings, in which:

FIG. 1 is a side elevation of a ring and pinion gear unit embodying the present invention.

Figure 2:
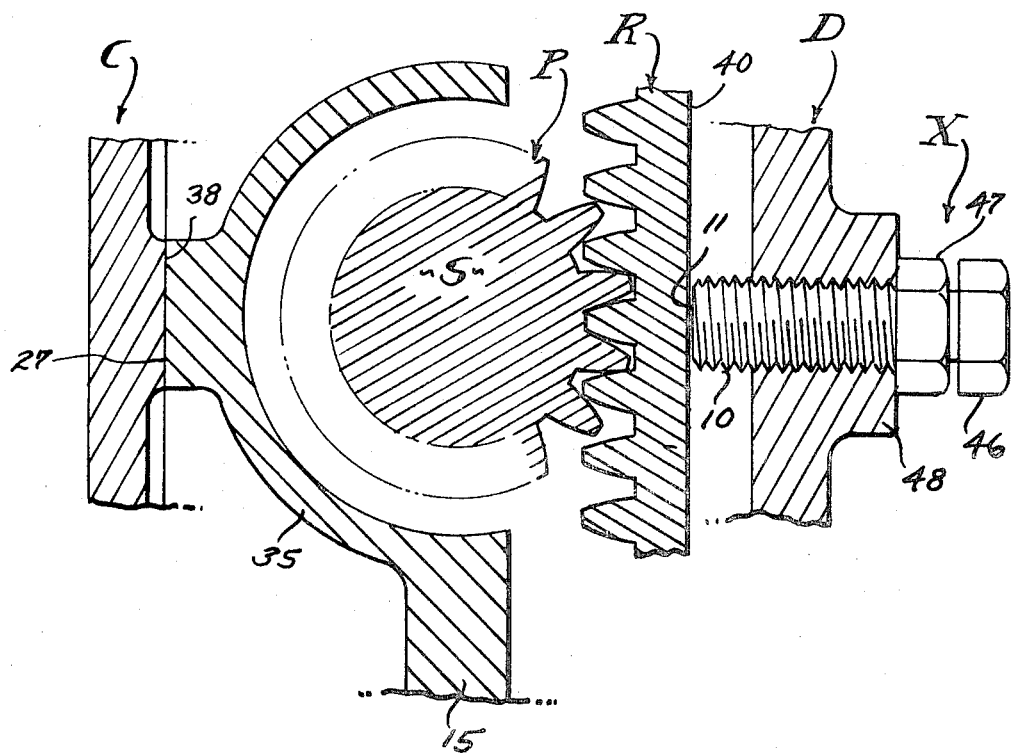
Figure 3:
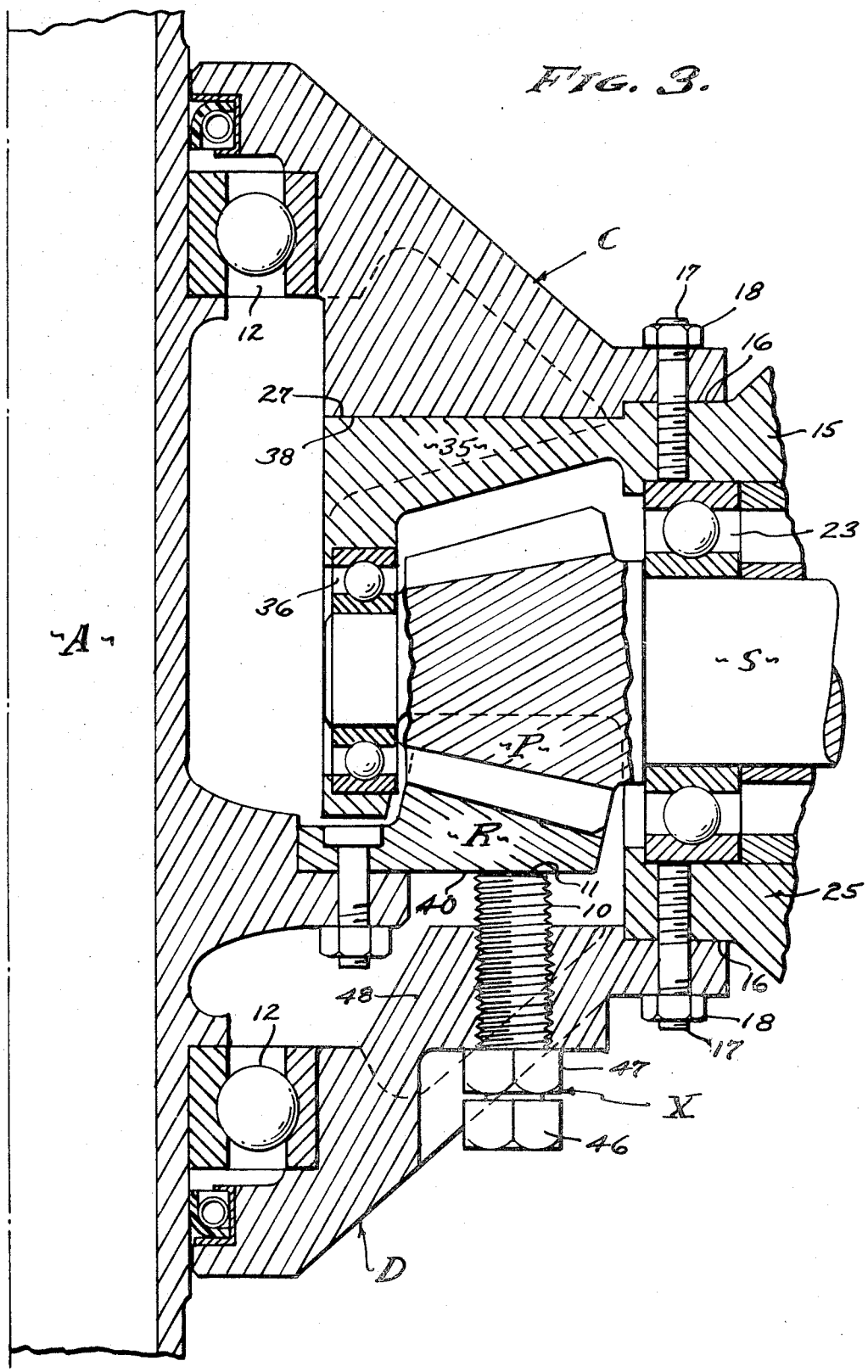

FIGS. 2 and 3 are each enlarged detailed fragmentary views taken as indicated by lines 2—2 and 3—3 on FIG. 1 respectively.

PREFERRED EMBODIMENT

Referring now to the drawings, the gear case B is shown as a quick change unit involving a center section 15 of cylindrical form having spaced parallel side faces 16 in planes normal to a central axis on which the drive axle A is to operate. The center section is therefore characteristic of an open-ended barrel closed by means of opposite side plates C and D in which the carrier bearings 12 are retained to take the normal axial and radial thrust loads of the axle A. As shown, studs 17 project from the opposite faces 16 to receive the side plates C and D, secured thereto by nuts 18 thereby closing the gear case.

The axle A is driven by means of pinion shaft S which places the pinion gear P within the center section 15 in a position to engage one side marginal portion of the ring gear R carried within the center section adjacent the periphery of said pinion gear. That is, the ring and pinion gears are complementary and they are provided with intermeshing teeth which can vary as to form and axial placement. For example, the tooth forms can be straight or helical and the gear axes can intersect or be hypoid; and in general the ring and pinion arrangement can be as required wherein the gear engagement is angular and such as to impose side thrust on the ring gear R when torque is applied through the pinion gear P. It is to be understood that inefficiencies resulting in the side thrust with which this invention is concerned are to be minimum but nevertheless occur; and it is the ring gear R that is rotatably captured in position against axial movements by the side plates C and D and the carrier bearings 12 and which is subjected to side loads at its periphery tending to separate the toothed portions of the two gears P and R.

The quick change feature of the gear case B is shown and illustrates a practical application of this invention as applied to race car drive units. As shown, a drive shaft 20 extends through the lower portion of the center section 15, supported upon spaced bearings 21 and 22, while the pinion shaft S extends into the cylindrical case on spaced bearings 23 and 24, the two shafts being on spaced parallel axes. A housing 25 extends from the case B surrounding the bearings 22 and 24 to house changeable drive gears 26 and 27 by which the drive shaft 20 propels the pinion shaft S. A quickly removeable cover plate 28 is secured by means of nuts 30 to studs 29 projecting from the housing 25; and all to the end that the pinion gear P is driveable to impose torque loads upon the ring gear R.

In accordance with this invention and the general object thereof to reinforce the thrust capabilities of the gear transfer unit, the pinion gear P is immoveably journaled in the center section 15 by means of a straddle-mount 35 made as part of said center section and preferably integral therewith. In practice, the straddle-mount 35 is part of the casting which forms the center section 15 and embraces the pinion gear P while exposing one side thereof which intermeshes with the opposing side marginal portion of the ring bear R. The straddle-mount 35 features a radial thrust bearing 36 carrying the terminal end of the pinion gear P and spaced from the bearing 23 and between which the pinion gear operates. The straddle-mount 35 also features a thrust face 27, parallel with or coplanar with the center section side face 16 and which is engaged by a complementary coplanar boss 39 on the inside of side plate C. Upon assembly of the side plate C with center section 15 the straddle-mount 35 is structurally reinforced and prevented from deflecting away from the ring gear R.

In accordance with the present invention, the side thrust limiter X is provided to restrict lateral deflection of the marginal toothed portion of the ring gear R and thereby reinforces the thrust capabilities of the gear transfer unit comparable with the aformentioned reinforcement afforded by the straddle-mount 35. In practice, the bearing 10 in which the side thrust limiter X is preferably embodied is carried by the side plate D and with its thrust face 11 oppsing the straddle-mount 35 and pinion gear P; the marginal portion of the ring gear R being disposed therebetween. That is, one side face of the ring gear R is toothed and intermeshed with the pinion gear P while the other side face 40 is in a plane normal to the rotational axis of the ring gear and engageable with the thrust face 11 of bearing 10. Upon assembly of side plate D with the center section 15, the marginal side face 40 of the ring gear R remains free, as the bearing 10 is moveable and is subsequently brought into near proximity to the side face 40.

The side thrust limiter X is adjustably carried by a boss 48 in the side plate D to be moved in a direction parallel to the rotational axis of axle A. Since the marginal portion of the ring gear R is radially displaced from the axis thereof, the bearing 10 is correspondingly displaced to occur opposite the load center of the ring and pinion interengagement. In its preferred form, the bearing 10 is a threaded element of substantial diameter that is rotatably secured by a lock nut 47. The bearing element 10 is threadedly engaged through the boss 48 with a head 46 at the exterior of the side plate D. Therefore, the thrust face 11 of the side thrust limiter X is adjustable into near or touching engagement with the side face 40, independently of the pre-load and axial positioning of the ring gear R, after which the lock nut 47 is tightened to fix the proximity of the thrust bearing face 11 to the face 40.

From the foregoing it will be seen that a condition of equilibrim is established between the side plates C and D which incorporate the bosses 38 and 48 and which work in opposition to reinforceably oppose the straddle-mount 35 and side face 40 respectively. All radial thrust generated by torque applied through the pinion gear P is carried by the bearings 23 and 36, and the side thrust reaction thereof resulting in deflection of the ring gear R is taken by the side thrust bearing face 11. During normal operation of the ring and pinion gears there will be no engagement of the face 40 with the side thrust bearing face 11; however, if and when the side thrust results in a deflection that exceeds the proximity clearance of the side thrust bearing face 11 there will be a restrictive engagement thereof with face 40. In practice, such restrictive engagements will be few and momentary when experienced as a result of power surges and/or impact loads, and consequently the wear of face 40 and of side thrust bearing face 11 will be negligible; and said wear can be compensated for from time to time by suitable adjustments made from the exterior of the unit, as described.

Having described only a typical preferred form and application of my invention, I do not wish to be limited or restricted to the specific details herein set forth, but wish to reserve to myself any modifications or variations that may appear to those skilled in the art:

I claim:

1. In combination with a transmission case having a ring gear and a pinion gear, said ring and pinion gears being rotatably journaled in bearings carried in the case to take the normal axial and radial thrust loads, the ring gear having a circumferentially disposed marginal portion intermeshed with the pinion gear at one side and a coextensive face at the opposite side; and a side thrust limiter engageable with said opposite side face to prevent separation of the intermeshed gears by restricting lateral deflection at the marginal portion of said ring gear and comprising a bearing with a thrust face positioned in close proximity to the coextensive face at the opposite side of said marginal portion of the ring gear, thereby reinforcing the combination against thrust loads causing lateral deflection of the marginal portion of the ring gear and interface engagement of said opposite side face thereof with said side thrust limiter.

2. The combination of claim 1 wherein the side thrust limiter is positioned opposite the load center of the ring and pinion interengagement.

3. The combination of claim 1 wherein the coextensive face at the opposite side of the ring gear is in a plane normal to the axis of rotation of said ring gear and the thrust face of the side thrust limiter bearing is juxtapposed parallel to said coextensive face.

4. The combination of claim 1 wherein the coextensive face at the opposite side of the ring gear is in a plane normal to the axis of rotation of the said ring gear and the thrust face of the side thrust limiter bearing is juxtapposed opposite the load center of the ring and pinion interengagement parallel to said coextensive face.

5. The combination of claim 1 wherein the side thrust limiter is positioned opposite the load center of the ring and pinion interengagement and is held fixed by adjustment means.

6. The combination of claim 1 wherein the coextensive face at the opposite side of the ring gear is in a plane normal to the axis of rotation of said ring gear and the thrust face of the side thrust limiter bearing is held juxtapposed parallel thereto by adjustment means.

7. The combination of claim 1 wherein the coextensive face at the opposite side of the ring gear is in a plane normal to the axis of rotation of said ring gear and the thrust face of the side thrust limiter bearing is held juxtapposed opposite the load center of the ring and pinion interengagement and parallel thereto by adjustment means.

8. In combination with a transmission case having a center section closed by opposite side plates assembled therewith and having bearings carried thereby journaling a ring gear on a rotational axis and said center section having bearings carried thereby journaling a pinion gear on a rotational axis angularly related to said ring gear axis, said gears being journaled in the case to take the normal axial and radial thrust loads and the ring gear having a circumferentially disposed marginal portion intermeshed with the pinion gear at one side and a coextensive face at the opposite side; a side thrust limiter engageable with said opposite side face to prevent separation of the intermeshed gears by restricting lateral deflection at the marginal portion of said ring gear and comprising a bearing with a thrust face carried by one of said side plates and positioned thereby in close proximity to the coextensive face at the opposite side of said marginal portion of the ring gear, thereby reinforcing the combination against thrust loads causing lateral deflection of the marginal portion of the ring gear and interface engagement of said opposite side face thereof with said side thrust limiter.

9. The combination of claim 8 wherein the side thrust limiter is positioned by said one side plate opposite the load center of the ring and pinion interengagement.

10. The combination of claim 8 wherein the coextensive face at the opposite side of the ring gear is in a plane normal to the axis of rotation of said ring gear and the thrust face of the side thrust limiter bearing is positioned by said one side plate and juxtapposed parallel to said coextensive face.

11. The combination of claim 8 wherein the coextensive face at the opposite side of the ring gear is in a plane normal to the axis of rotation of the said ring gear and the thrust face of the side thrust limiter bearing is positioned by said one side plate juxtapposed opposite the load center of the ring and pinion interengagement parallel to said coextensive face.

12. The combination of claim 8 wherein the side thrust limiter is positioned by said one side plate opposite the load center of the ring and pinion interengagement and is held fixed by adjustment means.

13. The combination of claim 8 wherein the coextensive face at the opposite side of the ring gear is in a plane normal to the axis of rotation of said ring gear and the thrust face of the side limiter bearing is held positioned by said one side plate and juxtapposed parallel to said coextensive face by adjustment means.

14. The combination of claim 8 wherein the coextensive face at the opposite side of the ring gear is in a plane normal to the axis of rotation of said ring gear and the thrust face of the side thrust limiter bearing is held by said one side plate and juxtapposed opposite the load center of the ring and pinion interengagement and parallel to said coextensive face by adjustment means.

15. In combination with a transmission case having a center section with spaced planar ends closed by opposite side plates assembled therewith and having bearings carried thereby journaling a ring gear on a rotational axis and said center section having a boss with bearings carried thereby journaling a pinion gear on a rotational axis angularly related to said ring gear axis, said gears being journaled in the case to take the normal axial and radial thrust loads, the ring gear having a circumferentially disposed marginal portion intermeshed with the pinion gear at one side and a coextensive face at the opposite side; a side thrust limiter engageable with said opposite side face to prevent separation of the intermeshed gears by restricting lateral deflection at the marginal portion of said ring gear and comprising a bearing with a thrust face carried by one of said side plates and positioned thereby in close proximity to the coextensive face at the opposite side of said marginal portion of the ring gear, said boss having interface engagement with the other side plate thereby reinforcing the combination against thrust loads causing lateral deflection of the marginal portion of the ring gear and interface engagement of said opposite side face thereof with said side thrust limiter.

16. The combination of claim 15 wherein the side thrust limiter is positioned by said one side plate and the said boss is positioned by said other side plate and in each instance opposite the load center of the ring and pinion interengagement.

17. The combination of claim 15 wherein the coextensive face at the opposite side of the ring gear is in a plane normal to the axis of rotation of said ring gear and the thrust face of the side thrust limiter bearing is positioned by said one side plate and juxtapposed parallel to said coextensive face.

18. The combination of claim 15 wherein the coextensive face at the opposite side of the ring gear is in a plane normal to the axis of rotation of said ring gear and the thrust face of the side thrust limiter bearing is positioned by said one side plate and the said boss is positioned by said other side plate and in each instance opposite the load center of the ring and pinion interengagement.

19. The combination of claim 15 wherein the side thrust limiter is positioned by said one side plate and the said boss by the other side plate and in each instance opposite the load center of the ring and pinion interengagement, said side thrust limiter being fixed in position by adjustment means.

20. The combination of claim 15 wherein the coextensive face at the opposite side of the ring gear is in a plane normal to the axis of rotation of said ring gear and the thrust face of the side limiter bearing is held positioned by said one side plate and the said boss by the other side plate, said side thrust limiter being fixed in position by adjustment means.

21. The combination of claim 15 wherein the coextensive face at the opposite side of the ring gear is in a plane normal to the axis of rotation of said ring gear and the thrust face of the side limiter bearing is held positioned by said one side plate and the said boss by the other side plate, and in each instance opposite the load center of the ring and pinion interengagement, said side thrust limiter being fixed in position by adjustment means.

* * * * *